(12) United States Patent
Malatesta (10) Patent No.: US 9,910,741 B2
(45) Date of Patent: *Mar. 6, 2018

(54) NON-DESTRUCTIVE DATA STORAGE

(71) Applicant: Workday, Inc., Pleasanton, CA (US)

(72) Inventor: John Malatesta, Alamo, CA (US)

(73) Assignee: Workday, Inc., Pleasanton, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/858,023

(22) Filed: Sep. 18, 2015

(65) Prior Publication Data

US 2016/0004604 A1 Jan. 7, 2016

Related U.S. Application Data

(63) Continuation of application No. 14/286,707, filed on May 23, 2014, now Pat. No. 9,177,010, which is a continuation of application No. 13/253,017, filed on Oct. 4, 2011, now Pat. No. 8,767,724, which is a continuation of application No. 11/429,645, filed on May 5, 2006, now Pat. No. 8,059,635.

(51) Int. Cl.
*G06F 17/30* (2006.01)
*G06F 11/14* (2006.01)

(52) U.S. Cl.
CPC .... *G06F 11/1458* (2013.01); *G06F 17/30368* (2013.01); *G06F 17/30551* (2013.01)

(58) Field of Classification Search
CPC ................................................. G06F 17/30551
See application file for complete search history.

(56) References Cited

U.S. PATENT DOCUMENTS

| | | | | |
|---|---|---|---|---|
| 6,233,573 B1* | 5/2001 | Bair | ................. | G06F 17/30551 |
| 8,059,635 B1* | 11/2011 | Malatesta | ......... | G06F 17/30368 |
| | | | | 370/374 |
| 8,767,724 B2* | 7/2014 | Malatesta | ......... | G06F 17/30368 |
| | | | | 370/381 |
| 9,177,010 B2* | 11/2015 | Malatesta | ......... | G06F 17/30368 |

OTHER PUBLICATIONS

Lum et al., Designing DBMS Support for the Temporal Dimension, Jun. 18-21, 1984, SIGMOD '84 Proceedings of the 1984 ACM SIGMOD international conference on Management of data, p. 115-130.*

* cited by examiner

*Primary Examiner* — Hoon J Chung
(74) *Attorney, Agent, or Firm* — Van Pelt, Yi & James LLP (57) ABSTRACT

Non-destructive data storage is disclosed. An information change is stored that is associated with a business object such that tracking of the information change is enabled with respect to one a transaction time and/or an effective time. The stored information change is accessed with respect to a time.

14 Claims, 8 Drawing Sheets

NON-DESTRUCTIVE DATA STORAGE

CROSS REFERENCE TO OTHER APPLICATIONS

This application is a continuation of co-pending U.S. patent application Ser. No. 14/286,707, entitled NON-DESTRUCTIVE DATA STORAGE filed May 23, 2014 which is incorporated herein by reference for all purposes, which is a continuation of U.S. patent application Ser. No. 13/253,017, now U.S. Pat. No. 8,767,724, entitled NON-DESTRUCTIVE DATA STORAGE filed Oct. 4, 2011 which is incorporated herein by reference for all purposes, which is a continuation of U.S. patent application Ser. No. 11/429,645, now U.S. Pat. No. 8,059,635, entitled NON-DESTRUCTIVE DATA STORAGE filed May 5, 2006 which is incorporated herein by reference for all purposes.

BACKGROUND OF THE INVENTION

Databases often contain vitally important records for a company. These records can include human resource, corporate, financial, legal, medical, and other records. However, databases typically have records that, when changed, are updated in a simple way that destroys the previous state that existed before the change. In some cases, a log of changes is recorded to preserve changed data between times when a full backup of the database was performed. However, in order to reconstruct the state of a record or the state of the database at a given time, all of the logged changes need to be replayed from a prior known backed up state to the time of interest. This is a prohibitively time consuming process especially if the state of only a few records is desired at a previous time is desired to be known. In some other cases, all the database changes are logged in the database by duplicating the database row entry every time there is a change to a data field in the row. This allows rapid searching and easy access for the status of a record at a given time. However, for every small change in any field, the data for the entire row is replicated leading to a very inefficient use of storage space. It would be beneficial to have a rapidly searchable and easily accessible record state for any given time without losing storage efficiency.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Non-destructive data storage is disclosed. An information change associated with a business object is stored such that tracking of the information change is enabled with respect to one of the following: a transaction time, an effective time, or a transaction time and an effective time. A stored information change is accessed with respect to a time. In some embodiments, structured financial, human resource, product or service information (e.g., information regarding the creation sale or delivery of product or services to a customer), medical, corporate, legal, and other information is efficiently stored so that the state of the information at a given time can be easily accessed and audited. Also, the information can be effective dated such that the changes to the information—for example, tax rate changes taking effect on a certain date, raises or promotions taking place on a certain date, etc.—are made effective, or operable, at a specific time/date. These changes are then used by the system for processing—for example, payroll is calculated using the tax tables that are effective when the payroll is being processed. The effective date for a change can be in the past, at the time of entry, or in the future. In addition, corrections are also handled such that an auditable trail of the corrections are accessible—for example, a person's raise is entered incorrectly in the system, later corrected, and subsequently properly handled in the system for tax withholding and corrections for overpayment. In addition, the state of information can also be accessed or tracked with respect to transaction times so that it is possible to determine when information changes were requested or executed.

Figure 1:
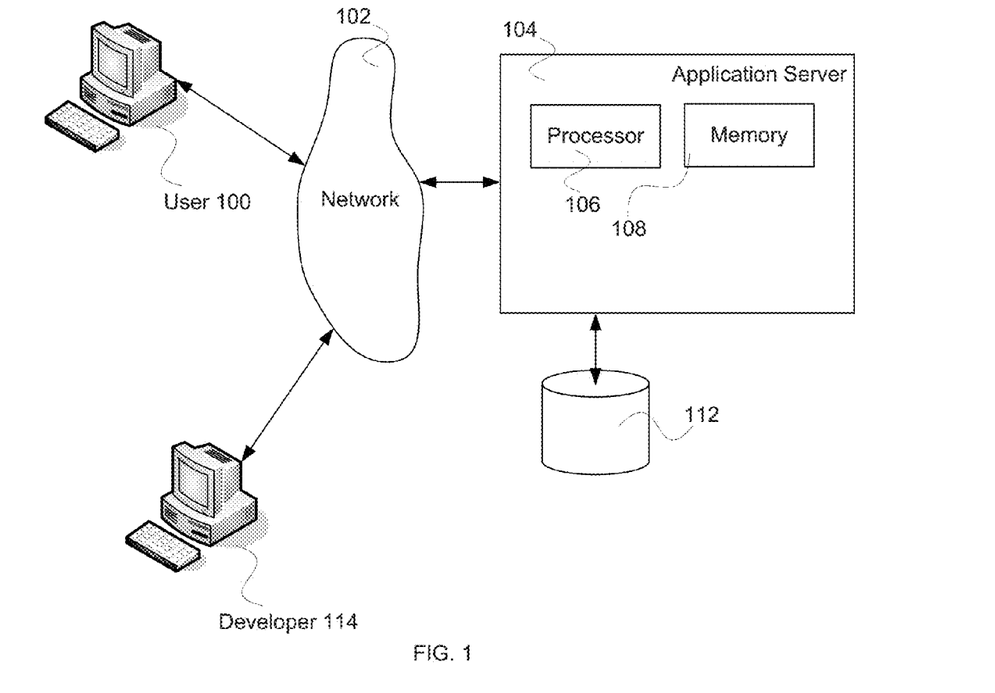
FIG. 1 is a block diagram illustrating an embodiment of a system used to enable non-destructive data storage.

FIG. 1 is a block diagram illustrating an embodiment of a system used to enable non-destructive data storage. In the example shown, application server 104 includes processor 106, and memory 108. Application server 104 is coupled to external storage 112 so that application server 104 is able to store information to and access information from external storage 112. Application server 104 is also coupled to network 102. In various embodiments, network 102 comprises one or more of the following: a local area network, a wide area network, a wired network, a wireless network, the Internet, or any other appropriate network. Network 102 enables user 100 and developer 114 to access application server 104. In some embodiments, developer 114 specifies an application that runs on application server 104. The application tracks additions and/or changes to stored information. In various embodiments, stored information is related to a business requirement such as an expense report, a personnel file, information related to an employee, or any other relevant information.

Figure 2:
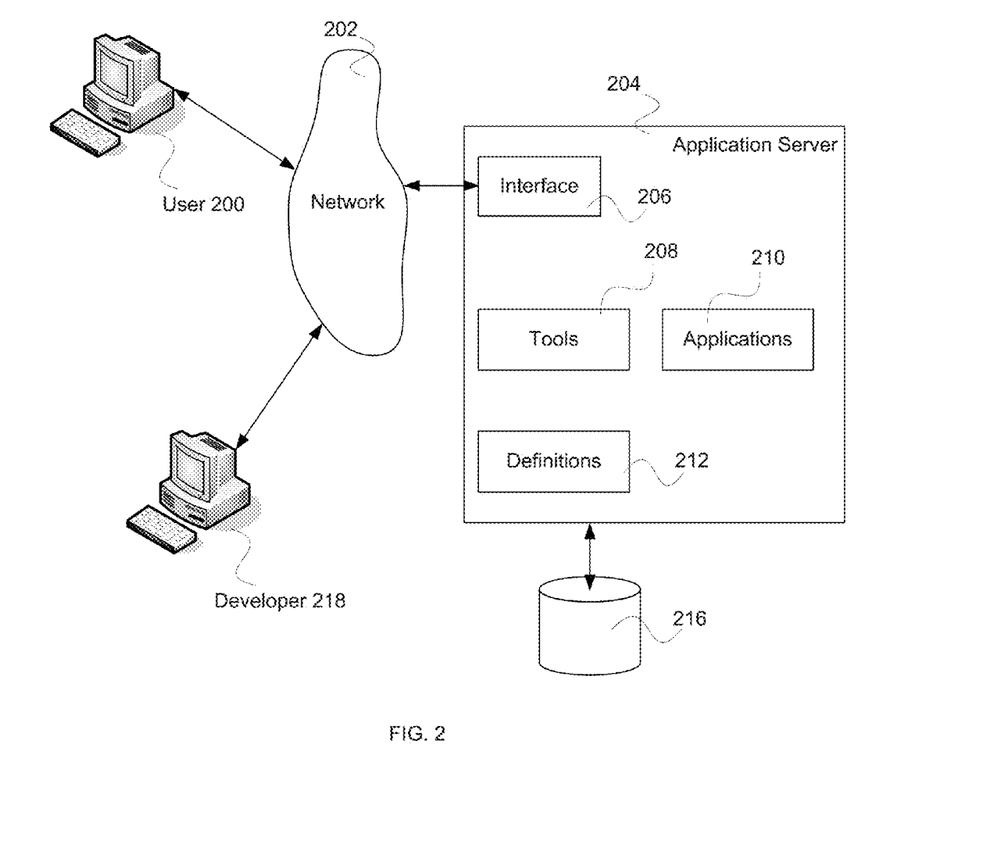
FIG. 2 is a block diagram illustrating an embodiment of a system used to enable non-destructive data storage.

FIG. 2 is a block diagram illustrating an embodiment of a system used to enable non-destructive data storage. In some embodiments, application server 104 of the system of FIG. 2 and application server 204 of the system of FIG. 1 are the same but viewed from a hardware-oriented and from a software-oriented perspective, respectively. In the example shown, application server 204 includes interface 206, tools 208, applications 210, and definitions 212. Applications 210 are composed of definitions 212 and can be built using tools 208 by developer 218. Definitions 212 include definitions of a class of business objects, of the attributes of the business object, and of the defined relations available to the business object between classes of business objects. User 200 accesses applications 210 via network 202. Application server 204 is coupled to external storage 216 so that application server 204 is able to store information to and access information from external storage 216. Application server 204 is also coupled to network 202. In various embodiments, network 202 comprises one or more of the following: a local area network, a wide area network, a wired network, a wireless network, the Internet, or any other appropriate network. Network 202 enables user 200 and developer 218 to access application server 204.

Figure 3:
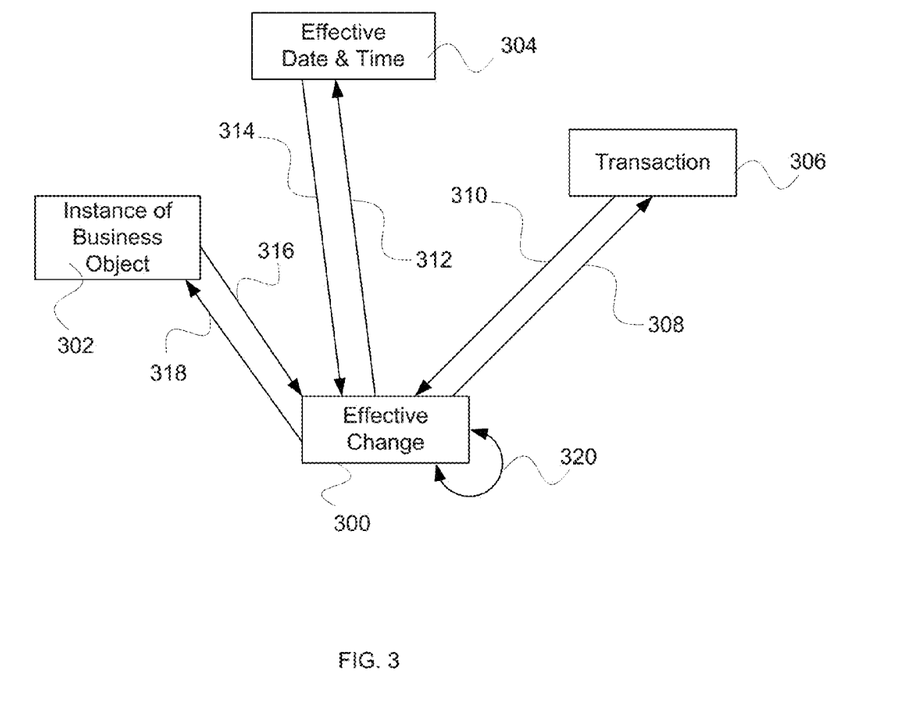
FIG. 3 is a block diagram illustrating an embodiment of objects used to enable non-destructive data storage.

FIG. 3 is a block diagram illustrating an embodiment of objects used to enable non-destructive data storage. In some embodiments, the objects in FIG. 3 are instantiated in application server 204 during the execution of an application of applications 210. In the example shown, instance of a business object 302 comprises an instance of a class of objects that has relevance or importance—for example, a manager, an employee, an organization, a subsidiary, a business location, an expense report, a personnel file, etc. Effective change 300 comprises an object representing a change in information related to an instance of a business object. Effective date & time 304 is an object that represents the date and time including millisecond, second, minute, hour, day, month, and year. Transaction 306 is an object that identifies a transaction happened and includes information related to who requested the transaction, when the transaction occurred, what the transaction was, etc.

Instance of a business object 302 has relationships 316 and 318 with effective change 300. Relationship 316 refers to the latest effective change for instance of business object 302. Relationship 318 refers to the instance of business object 302 having effective changes as described, for example, by effective change 300. Effective change 300 can refer to a change in the value or an attribute or relationship change for instance of business object 302—for example, an instance of a manager business object adds a reference to a new employee business object. Effective change 300 has relationships 320 with effective change 300 referring to prior effective changes and next effective changes. Effective change 300 has relationships 312 and 314 with effective date & time 304. Relationship 312 refers to the effective date and time of an effective change. Relationship 314 refers to all effective changes sharing an effective date and time. Effective change 300 has relationships 308 and 310 with transaction 306. Relationship 308 refers to the transaction in which effective change was processed. Relationship 310 refers to all effective changes for the transaction. Effective changes referred to by relationships 310 may relate to a plurality of instances of business objects.

In some embodiments, an instance of tax rate can include a name (e.g., Contra Costa County tax stored as an attribute of the instance) and a rate which has changed over time (e.g., 8¼% during 2004 and 8¾% during 2005 stored as effective changes). Effective change 300 includes a transaction time and an effective time that enables an application to determine the state of the information associated with the instance effective at a certain date and time and/or also when the changes to the information were requested/executed. In some embodiments, the chain of effective changes is scanned through in order to find the relevant information associated with the instance at a certain date and time.

Figure 4:
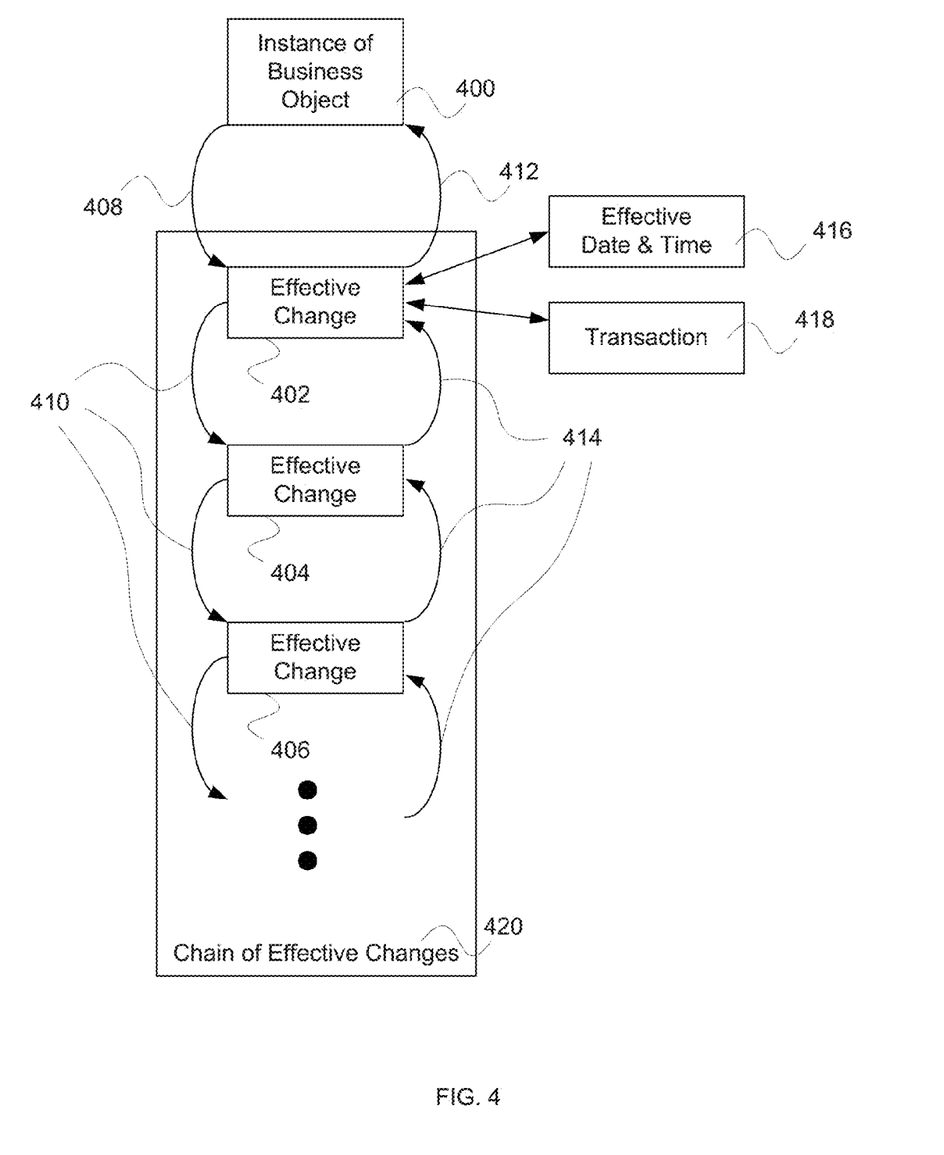
FIG. 4 is a block diagram illustrating an embodiment of objects used to enable non-destructive data storage.

FIG. 4 is a block diagram illustrating an embodiment of objects used to enable non-destructive data storage. In some embodiments, chain of effective states 420 of FIG. 4 is an implementation of effective states 300 of FIG. 3. The chain of effective states records the state of the instance of business object or changes to the instance of business object through time. In the example shown, instance of business object 400 has relationships 408 and 412 with effective change 402. Relationship 408 refers to the latest effective change for instance of business object 400. Relationship 412 refers to the instance of business object 400 having effective changes as described, for example, by effective change 402. The chain of effective states 420 includes a plurality of linked changes represented in FIG. 4 by effective change 402, which is linked to effective change 404, which in turn is linked to effective state 406, etc.

Effective change 402, 404, and 406 are ordered primarily in descending effective date & time—for example, effective change 402 (top object) is the latest effective change and effective change 406 is a later effective change. If effective change objects have the same effective date & time, then the effective change object are ordered in descending transaction date & time. Relations 410 refer to prior effective change objects. Relations 414 refer to next effective change objects. Each effective change object has relations with an effective data & time object and a transaction object, as represented by effective date & time 416 and transaction 418 with respect to effective change 402 in FIG. 4.

In some embodiments, accessing information regarding a business object by walking a chain of effective states, such as chain of effective states 420, enables real-time access (e.g., real-time as opposed to reconstructing the information by replaying a log file) to the state of information as of a time with regard to transaction time, effective time, or both transaction time and effective time. In some embodiments, business object information, including a chain of effective state information, is contained in memory such as memory 108 of FIG. 1.

Figure 5A:
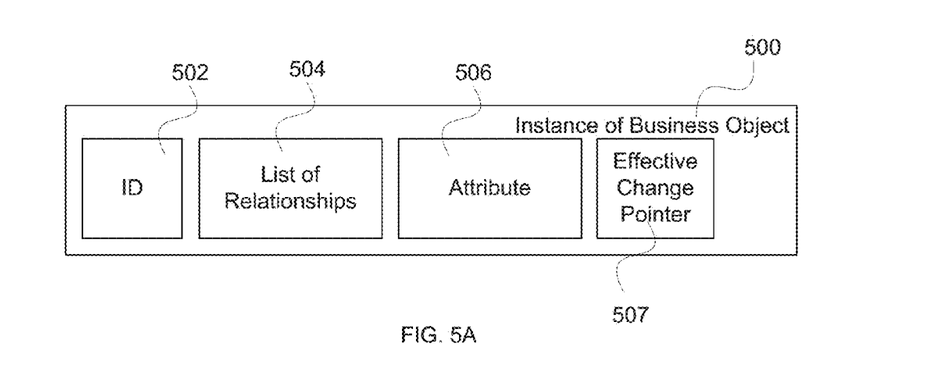
FIG. 5A is a block diagram illustrating an embodiment of an instance of a business object representation used to enable non-destructive data storage.

FIG. 5A is a block diagram illustrating an embodiment of an instance of a business object representation used to enable non-destructive data storage. In some embodiments, the representation of instance of business object 500 in FIG. 5A is used to implement instance of business object 302 of FIG. 3 and/or instance of business object 400 of FIG. 4. In the example shown, instance of business object 500 includes ID 502, list of relationships 504, attribute 506, and pointer to effective change 507. ID 502 comprises a unique identification number for instance of business object 500. List of relationships 504 comprises a list of relationships of the instance of business object 500 that do not require effective change tracking Attribute 506 comprises a list of attributes of the instance of business object 500 that do not require effective change tracking Pointer to effective change 507 points to a relationship with an effective change object.

Figure 5B:
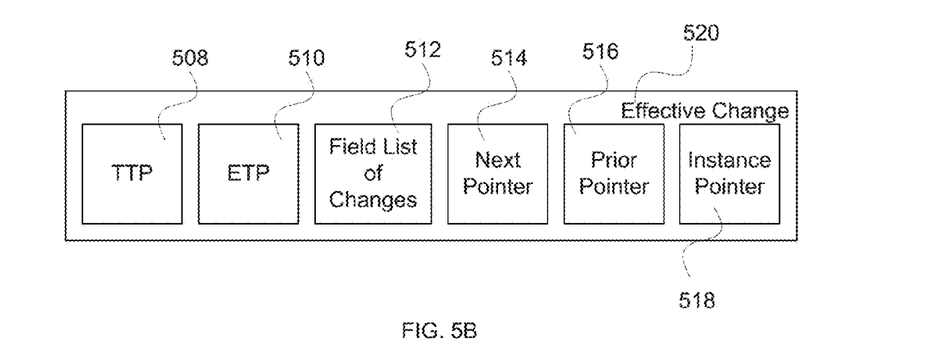
FIG. 5B is a block diagram illustrating an embodiment of an effective change object representation used to enable non-destructive data storage.

FIG. 5B is a block diagram illustrating an embodiment of an effective change object representation used to enable non-destructive data storage. In some embodiments, the representation of effective change 520 in FIG. 5B is used to implement effective change 300 of FIG. 3 and/or effective change 402, 404, and 406 of FIG. 4. In the example shown, effective change 520 includes transaction time pointer (TTP) 508, effective time pointer (ETP) 510, field list of changes 512, next pointer 514, prior pointer 516, instance pointer 518. TTP 508 comprises a pointer to a transaction date & time where the transaction comprises a time when an effective change was processed or requested to be processed. In some embodiments, if the transaction date and time is null, then the transaction time is interpreted to mean the beginning of time. ETP 510 comprises a pointer to an effective date & time where the effective time comprises a time when a change specified in a transaction is indicated to be effective. The effective date & time can be before, at the same time, or after the transaction date & time. For example, a raise would change the salary level for an employee retroactively if the effective date & time was prior to the transaction date & time or in the future if the effective time was later (e.g., 2 months in the future) than the transaction date & time. If the effective change corresponds to a correction, the effective time & date is the same as the effective change object that the correction is for and the transaction date & time will be later than the effective change date & time.

Field list of changes 512 comprises a list of changes specified by a transaction that occurred at a transaction date & time with regard to an instance of a business object and effective at an effective date & time. Field list of changes 512 may refer to changes in attribute values and/or changes in relationships between the instance of a business object and another instance of a business object. In various embodiments, the change includes a removal of a relationship or the deletion of an attribute value.

Next pointer 514 points to the next effective change object (later in effective time) associated with an instance of a business object. Prior pointer 516 points to the prior effective change object (earlier in effective time) associated with an instance of a business object. Instance pointer 518 points to the instance of a business object associated with the latest effective change object (top effective change object in the chain). In some embodiments, for the latest effective change object, next pointer 514 is null; for other effective change objects, instance pointer 518 is null; and for the earliest effective change, prior pointer 516 is null.

If the effective change corresponds to a correction, the effective time & date is the same as the effective change object that the correction is for and the transaction date & time will be later than the effective change date & time. Field list of changes 512 comprises values added to the instance—for example, values of attributes. For example, field list of changes 512 might have attribute values that have changed at one point when information for the instance was added to or changed (e.g., a change in the name and/or rate for an instance of tax rate). Some attributes include relationships to other instances.

Figure 6:
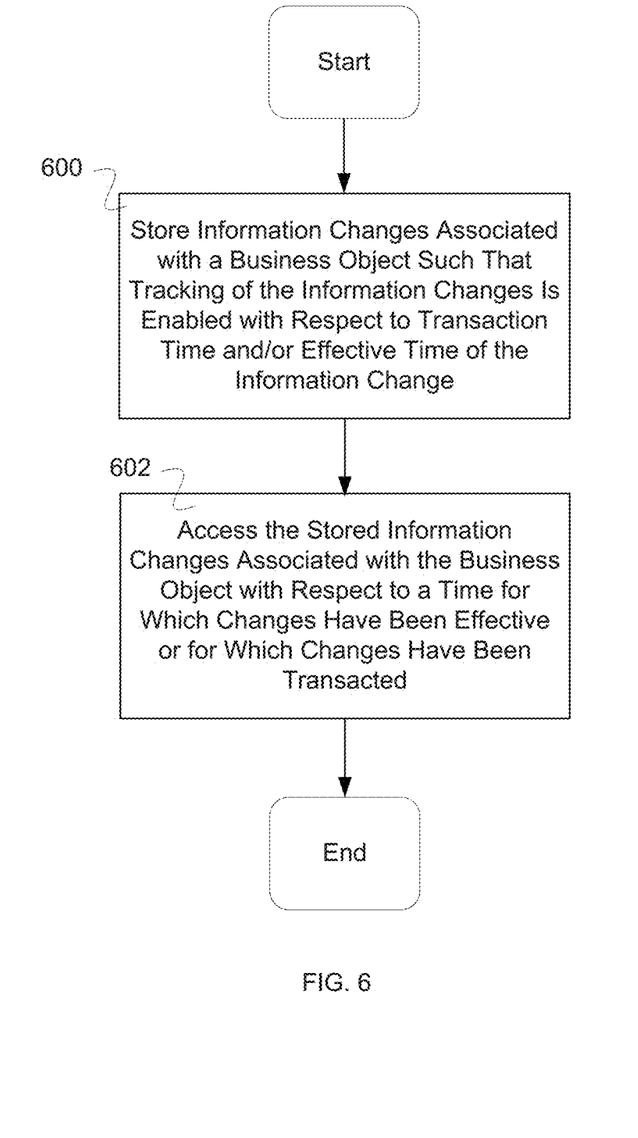
FIG. 6 is a flow diagram illustrating an embodiment of a process for non-destructive data storage.

FIG. 6 is a flow diagram illustrating an embodiment of a process for non-destructive data storage. In some embodiments, the process of FIG. 6 is executed on processor 106 of FIG. 1. In the example shown, in 600 information changes associated with a business object is stored such that tracking of the information changes is enabled with respect to transaction time and/or effective time of the information change. Tracking the information changes includes storing the changes to the information associated with business object in manner enabling the reconstruction of the state of the information at a given time. The information associated with the business object includes information as to the changes in state of the information including "removal" of the information. In some embodiments, information associated with the business object is not actually removed when the state of the information is changed to "removed." In 602, the stored information changes associated with the business object is accessed with respect to a time for which changes have been effective or for which changes have been transacted. Accessing the information changes associated with the business object can include building an audit report that allows visibility into all changes, additions, and deletions that have occurred to the information associated with the business object. Accessing the information changes associated with the business object can include reporting information appropriate for a particular date. The information changes associated with the business object is determined to be appropriate for a particular date by scanning through effective change information and determining the effective date of changes made to the information associated with the business object. The scanned information changes provide a full set of information so that the state of the information for a particular date can be determined based at least in part on the effective dates associated with the stored information.

Figure 7:
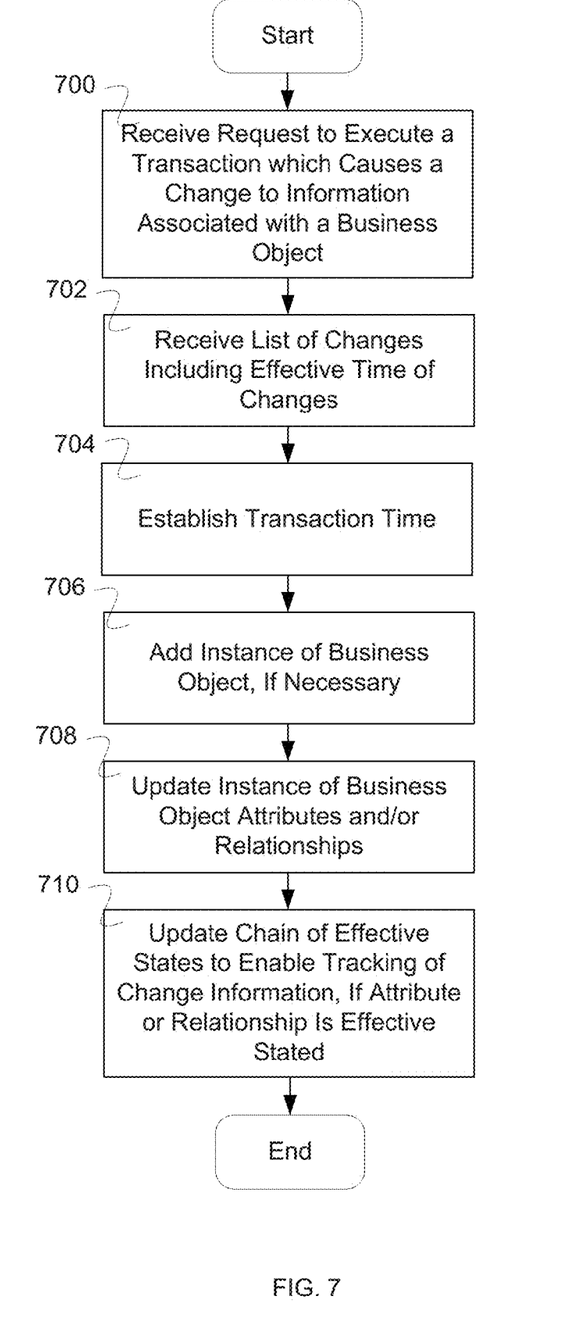
FIG. 7 is a flow diagram illustrating an embodiment of a process for storing information during non-destructive data storage.

FIG. 7 is a flow diagram illustrating an embodiment of a process for storing information during non-destructive data storage. In some embodiments, the process of FIG. 7 is used to implement 600 of FIG. 6. In the example shown, in 700 a request is received to execute a transaction which causes a change to information associated with a business object. A transaction comprises adding, or storing, one or more attributes and/or one or more relationships, to an instance of a business object. The transaction is exposed to the user as an available transaction. The developer sets up the features, or available transactions, that are exposed to the user during run time. In various embodiments, the transaction is requested by a user selecting a menu item, entering a command, clicking on a button, checking a box, or any other appropriate way to request the running of the transaction. In 702, a list of changes including effective time of changes is received. The list of changes comprises one or more attribute values and/or one or more relationships between an instance of business object and another instance of a business object. The list of changes is/are entered in a window that is designated by the developer and specified when the transaction feature is specified. In 704, the transaction time is established by the system so that tampering is made more difficult. In 706, if necessary (e.g., if an instance of business object does not already exist), an instance of the business object is added and/or stored. In 708, instance of business object attributes and/or relationships to another instance of a business object. In 710, if the attribute or relationship is effective stated, the chain of effective changes is updated to enable tracking of change information.

Figure 8:
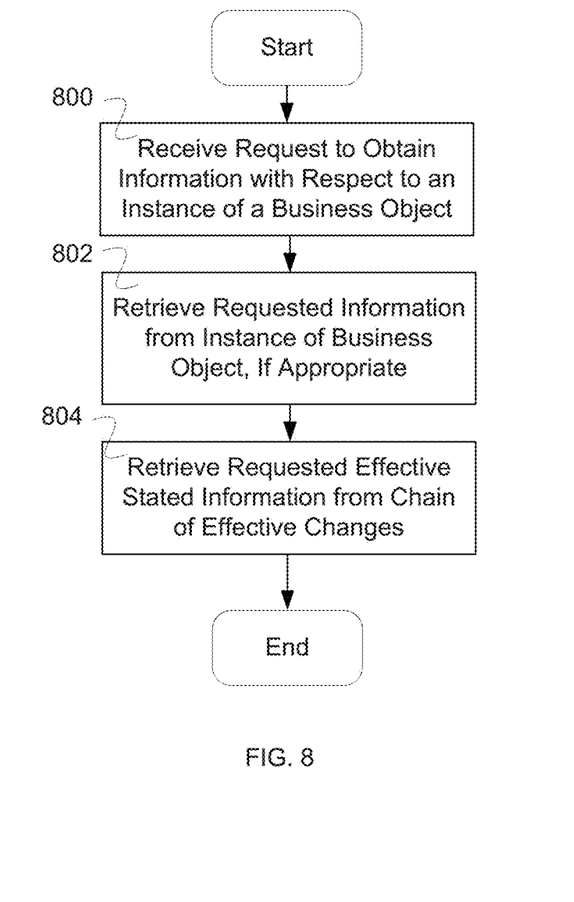
FIG. 8 is a flow diagram illustrating an embodiment of a process for accessing information during non-destructive data storage.

FIG. 8 is a flow diagram illustrating an embodiment of a process for accessing information during non-destructive data storage. In some embodiments, the process of FIG. 8 is used to implement 602 of FIG. 6. In the example shown, in 800 a request is received to obtain information with respect to an instance of a business object. For example, the state of one or more attributes and/or one or more relationships of an instance of a business object such as an employee's salary level at the beginning of the year. In some embodiments, the user is provided with a feature to show all attributes and/or relationships associated with an instance of a business object—for example, to show all tax rates as of today. In 802, requested information is retrieved from instance of business object, if appropriate. In 804, requested effective stated information is retrieved from the chain of effective changes. In some embodiments, an audit report, or another type of report, is created by accessing change information—for example, the entire history of a file (e.g., the personnel file of an employee) can be read and reported including when the file was created, changes to the file, who changed or added information to the file, or who deleted information from the file, when the file changes were made, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for non-destructive data storage including:
an interface to receive a request to obtain information with respect to an instance of an object, wherein the request to obtain information has an associated date and an associated time for a state of the information; and
a processor to:
retrieve the information from a chain of effective changes associated with the instance of the object, wherein the chain of effective changes includes a plurality of effective changes, the plurality of effective changes including a first effective change and a second effective change, the first effective change and the second effective change both including a transaction time pointer, an effective time pointer, a field list of changes, and a prior pointer, and wherein the retrieving of the information comprises to:
compare an effective date and an effective time associated with the first effective change with the associated date and the associated time; and
in response to a determination that the effective date and the effective time associated with the first effective change are later than or equal to the associated date and the associated time, obtain the second effective change to retrieve the information based on a next pointer associated with the first effective change.

2. A system as in claim 1, wherein the instance of the object is stored in a memory.

3. A system as in claim 1, wherein the associated date and the associated time is not compared to a transaction date and a transaction time of an effective change stored in the chain of effective changes.

4. A system as in claim 1, wherein the information comprises human resource information.

5. A system as in claim 1, wherein the information comprises financial information.

6. A system as in claim 1, wherein the information comprises corporate information.

7. A system as in claim 1, wherein the information comprises product or service information.

8. A system as in claim 1, wherein the instance of the object includes information related to a business requirement.

9. A system as in claim 1, wherein the instance of the object includes an attribute.

10. A system as in claim 1, wherein the instance of the object includes a relation.

11. A system as in claim 1, wherein the instance of the object includes a method.

12. A system as in claim 1, wherein the information is provided using a report.

13. A method for non-destructive data storage comprising:
receiving a request to obtain information with respect to an instance of an object; and
retrieving, using a processor, the information from a chain of effective changes associated with the instance of the object, wherein the chain of effective changes includes a plurality of effective changes, the plurality of effective changes including a first effective change and a second effective change, the first effective change and the second effective change both including a transaction time pointer, an effective time pointer, a field list of changes, and a prior pointer, and wherein the retrieving of the information comprises:
comparing an effective date and an effective time associated with the first effective change with the associated date and the associated time; and
in response to a determination that the effective date and the effective time associated with the first effective change are later than or equal to the associated date and the associated time, obtaining the second effective change to retrieve the information based on a next pointer associated with the first effective change.

14. A computer program product for non-destructive data storage, the computer program product being embodied in a non-transitory computer readable storage medium and comprising computer instructions for:
receiving a request to obtain information with respect to an instance of an object; and
retrieving the information from a chain of effective changes associated with the instance of the object, wherein the chain of effective changes includes a plurality of effective changes, the plurality of effective changes including a first effective change and a second effective change, the first effective change and the second effective change both including a transaction time pointer, an effective time pointer, a field list of changes, and a prior pointer, and wherein the retrieving of the information comprises:
comparing an effective date and an effective time associated with the first effective change with the associated date and the associated time; and
in response to a determination that the effective date and the effective time associated with the first effective change are later than or equal to the associated date and the associated time, obtaining the second effective change to retrieve the information based on a next pointer associated with the first effective change.

\* \* \* \* \*